United States Patent
Rogalla et al.

(10) Patent No.: US 7,971,621 B2
(45) Date of Patent: Jul. 5, 2011

(54) FILLING BELL FOR FILLING A TUBELESS TIRE

(75) Inventors: Martin Rogalla, Darmstadt (DE); Werner Lehr, Modautal (DE)

(73) Assignee: Schenck RoTec GmbH, Darmstadt (DE)

(*) Notice: Subject to any disclaimer, the term of this patent is extended or adjusted under 35 U.S.C. 154(b) by 171 days.

(21) Appl. No.: 12/386,726

(22) Filed: Apr. 22, 2009

(65) Prior Publication Data

US 2009/0260764 A1 Oct. 22, 2009

(30) Foreign Application Priority Data

Apr. 22, 2008 (DE) .......... 10 2008 020 205

(51) Int. Cl.
*B60C 25/132* (2006.01)
(52) U.S. Cl. .......... 157/1.17; 157/1
(58) Field of Classification Search .......... 157/1, 1.1, 157/1.17, 1.2
See application file for complete search history.

(56) References Cited

U.S. PATENT DOCUMENTS

| | | | |
|---|---|---|---|
| 3,814,163 A * | 6/1974 | Charles et al. | 157/1.1 |
| 5,509,456 A * | 4/1996 | Bonko et al. | 157/1 |
| 6,076,586 A | 6/2000 | Hans | |
| 6,467,524 B2 | 10/2002 | Ronge et al. | |
| 6,502,618 B1 * | 1/2003 | Kane et al. | 157/1.2 |
| 7,506,671 B2 | 3/2009 | Peinelt et al. | |

FOREIGN PATENT DOCUMENTS

| | | |
|---|---|---|
| DE | 196 00 323 | 7/1997 |
| DE | 198 01 455 | 7/1999 |
| DE | 199 61 468 | 6/2001 |
| DE | 10 2004 062 329 | 6/2006 |
| EP | 1 125 772 | 8/2001 |
| EP | 1 671 820 | 6/2006 |

OTHER PUBLICATIONS

European Search Report dated Aug. 5, 2009 (in German).

* cited by examiner

*Primary Examiner* — David B Thomas
(74) *Attorney, Agent, or Firm* — Collard & Roe, P.C.

(57) ABSTRACT

A filling bell can be used to fill a tubeless tire arranged on a wheel rim with a pressurized gas. The filling bell includes an annular sealing face which can be pressed onto a side wall of the tire. The filling bell also includes a central opening, into which the wheel rim may penetrate. The sealing face is formed by an annular flange which surrounds the opening and includes a plurality of wedge-shaped segments. The width of the wedge-shaped segments increases away from the opening. The wedge-shaped segments are displaceable relative to one another and substantially radially relative to the opening.

9 Claims, 4 Drawing Sheets

US 7,971,621 B2

FILLING BELL FOR FILLING A TUBELESS TIRE

CROSS REFERENCE TO RELATED APPLICATION

Applicant claims priority under 35 U.S.C. §119 of German Patent Application No. 10 2008 020 205.3 filed on Apr. 22, 2008.

FIELD OF THE INVENTION

The invention relates to a filling bell for filling a tubeless tire, arranged on a wheel rim, with a pressurized gas, the filling bell comprising a sealing face which can be pressed onto a side wall of the tire and which has a central opening into which the wheel rim can partially penetrate.

BACKGROUND OF THE INVENTION

In automatic series production, motor vehicle wheels which have tubeless tires are usually filled with compressed air by means of an inflation machine. In so doing, the wheel rim with assembled tire is positioned on a suitable base plate which downwardly seals the wheel during the filling procedure. Positioned on the upper side of the tire is a filling bell which upwardly seals the tire and the rim and by which the side wall of the tire is pressed downwards to such an extent during the filling procedure that there is produced between the tire bead and wheel rim an annular gap through which the compressed air guided into the filling bell can flow into the tire. The compressed air which has been introduced presses the tire with considerable force against the supporting plate and the filling bell. Once the filling pressure has been attained, the filling bell is lifted, as a result of which the side walls of the tire move apart in an axial direction until the tire beads have assumed their respective seating positions on the rim. For a filling procedure of this type, the filling bell must have an opening, the diameter of which is large enough so that it does not abut against the wheel rim, but can be put over the wheel rim. On the other hand, however, the diameter of the opening must not be so big that the filling bell radially contacts the upper side wall of the tire outside its high point. In that case, the filling bell would obstruct the radial movement of the tire, which could result in the tire bead not springing correctly into its seat. If the sealing edge of the bell was located in the vicinity of the cover of the tire, the result might be a high degree of leakage and inaccuracy in the filling pressure. Thus, a filling bell is only suitable for a limited size range of motor vehicle wheels.

Thus, for example, only those tires which have a bead seat diameter in the region of two inch sizes can usually be filled using a filling bell of a specific size.

In order to be able to fill tires of a greater size difference by means of a tire filling station, it is known, inter alia from EP 1 125 772 B1 to use a tire filling bell which has at least two filling rings of different diameters, the smaller or the larger filling ring being used according to the size of the tire.

DE 198 01 455 A1 discloses a tire inflating device which has three filling rings and a rim sealing ring which is arranged inside the smallest filling ring and is expanded to the greater diameter required in each case by an adjusting device when one of the two larger filling rings is used.

SUMMARY OF THE INVENTION

The object of the invention is to provide a tire-filling bell of the specified type which can be adjusted to different tire sizes and is characterized by a large adjustment range.

The filling bell according to the invention comprises a sealing face which can be pressed onto a side wall of the tire and which has a central opening into which the wheel rim can penetrate, the sealing face being formed by an annular flange which surrounds the opening and comprises a plurality of wedge-shaped segments, the width of which increases with the distance from the opening and which are displaceable relative to one another and substantially radially with respect to the opening. In the filling bell according to the invention, the diameter of the sealing face can be changed progressively by radially moving and displacing the segments with respect to one another and can thus be optimally adapted in a precise manner to the tire size to be inflated in each case. The filling bell according to the invention has the further advantage that the sealing face extends by a relatively great amount in a radial direction and thus forms a wide contact surface which reduces the stress on the tire during the filling procedure. Furthermore, the filling bell according to the invention provides the possibility of increasing the sealing face in a radial direction at the end of the filling procedure to thereby promote the radial movement of the side wall of the tire so that the tire bead can spring more easily over the hump into its seat on the rim.

According to a further proposal of the invention, the segments are connected to one another at their divergent edges in a positive and longitudinally displaceable manner. Such a connection of the segments produces a closed, annular unit which prevents an uncontrolled individual movement of the separate segments. All the segments can only be moved together in the same direction, either radially outwards or radially inwards, the extent of the movement being the same for all the elements. The segments always remain in engagement with one another and the opening which they surround always retains its central position.

To be able to effectively seal the filling bell outwards, it is further provided that a sealing element is positioned between each of the divergent edges of adjacent segments. The sealing element is preferably a profiled strip made of plastics material which fills the space between the segments and forms a sliding guide for moving the segments. The segments can also have holes for supplying a lubricant in the region of the sliding guide. In this manner, frictional resistances can be reduced which counteract the adjustment of the segments.

According to a further proposal of the invention, the segments can have, on their side remote from the sealing face, a journal by which they are radially displaceably and rotatably guided and held on a carrier plate. Furthermore, an actuation element can be provided which can collectively move the segments. A simple and advantageous embodiment of the actuation element consists of a disc cam which is rotatably mounted on the filling bell and has effective surfaces which act on the journals of the segments and extend in a radial and circumferential direction.

BRIEF DESCRIPTION OF THE DRAWINGS

The invention will be described in detail in the following with reference to embodiments which are shown in the drawings, in which.

DETAILED DESCRIPTION OF THE DRAWINGS

Figure 1:
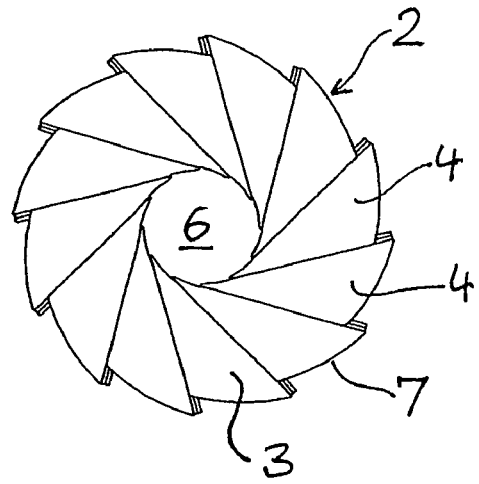
FIG. 1 is a view of the sealing face of a filling bell according to the invention in an adjustment having the smallest diameter.
Figure 2:
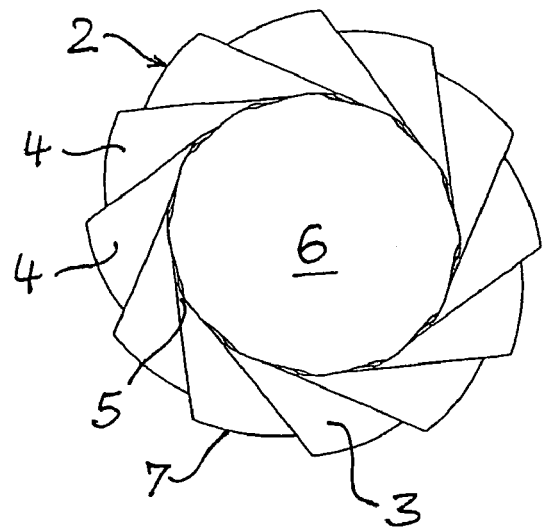
FIG. 2 is a view of the sealing face of a filling bell according to the invention in an adjustment having the greatest diameter.
Figure 3:
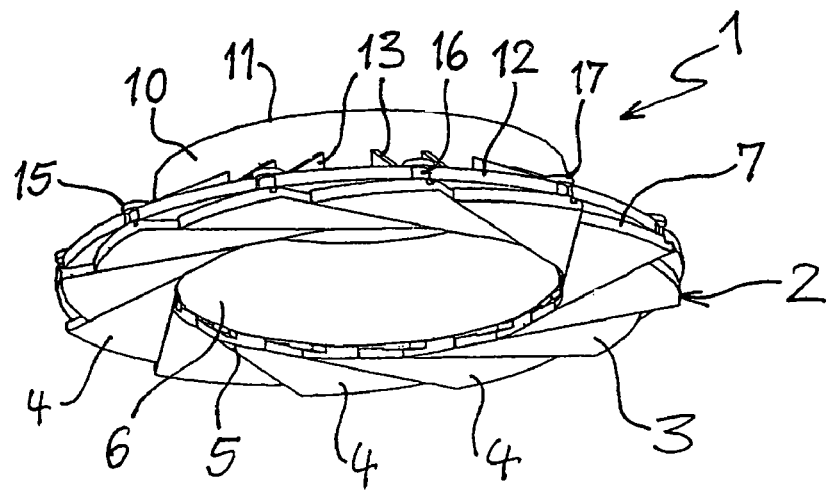
FIG. 3 is a perspective view of a first embodiment of a filling bell according to the invention.

The filling bell 1 shown in FIGS. 1 to 3 has a planar, annular sealing face 3 formed by an annular flange 2. The annular flange 2 consists of twelve congruent, wedge-shaped segments 4 which have a wedge angle of 30°. The segments 4 have inwardly directed acute ends 5 and a circular arc-shaped outer edge 7. Strung together and arranged in the same direction, the twelve segments 4 form a closed ring which extends over an angle of 360°. The segments 4 are arranged such that they each rest closely against one another with their divergent edges.

The diameter of the annular flange 2 formed by the segments 4 depends on the relative position assumed by the individual segments 4 with respect to one another. In the arrangement shown in FIG. 1, the acute, inwardly directed ends 5 of the segments 4 are arranged very closely together. Accordingly, there remains free in the center of the annular flange 2 only a relatively small opening 6. Seen purely geometrically, the segments 4 can also be moved to such an extent towards the center that their acute ends 5 meet at a point, thereby producing a closed circular surface. However, this would be of little use when providing a filling bell for filling tires, as an opening for the penetration of the wheel rim must be provided in the center of the filling bell.

If, as shown in FIG. 2, the segments 4 are moved with respect to one another such that their acute ends 5 are at a greater distance from one another, then as a result the diameter of the opening 6 and accordingly also the diameter of the annular flange 2 is increased.

In the two positions of the segments 4 shown in FIGS. 1 and 2, the outer contour of the annular flange 2 is irregular. This is due to the fact that the outer edge 7 of the segments 4 corresponds to an external diameter of the annular flange 2 which is greater than the external diameter in FIG. 1 and smaller than the external diameter in FIG. 2. The selection of an average diameter for determining the outer contour of the segments 4 has the advantage that the resulting deviations in the outer contour from the circular shape do not become too great when falling below the average diameter and also when exceeding said average diameter and a sufficiently large, closed annular surface remains available.

It can be seen from FIG. 3 how the annular flange 2 formed from segments 4 is positioned on and secured to the filling bell 1. The filling bell 1 has a cylindrical bell ring 10, the internal diameter of which determines the maximum size of the bell opening. Secured to the upper edge 11 of the bell ring 10 is a cover plate (not shown here) which tightly upwardly seals the bell ring 10 and on which are fitted the necessary connections for filling and emptying the interior of the bell. The cover plate is also attached to a lifting device by which the filling bell 1 can be moved in the direction of the cylinder axis of the bell ring 10. Attached to the lower edge of the bell ring 10 is an annular carrier plate 12 which extends radially outwards from the edge of the bell ring 10. For reinforcement purposes, the carrier plate 12 is also connected on its upper side to the outside of the bell ring 10 by radial webs 13, as can be seen particularly clearly in FIGS. 5 and 6. The carrier plate 12 has in regular spacings a number of radial slots 14 corresponding to the number of the segments 4, which radial slots 14 are open radially outwards.

Positioned on the lower side of the carrier plate 12 are the segments 4 which together form the annular flange 2. In this respect, the segments 4 are held and guided on the carrier plate 12 by journals 15. Each segment 4 carries a journal 15 which penetrates a radial slot 14 in the carrier plate 12 with a cylindrical shaft 16. On its free end, the shaft 16 bears a head 17 of a relatively large diameter which rests on the upper side of the carrier plate 12 and thereby firmly holds the segment 4, connected to the journal 15, on the carrier plate 12. The journals 15 can be moved in a radial direction along the radial slots 14 to enable the diameter of the annular flange 2 to be changed.

Figure 4:
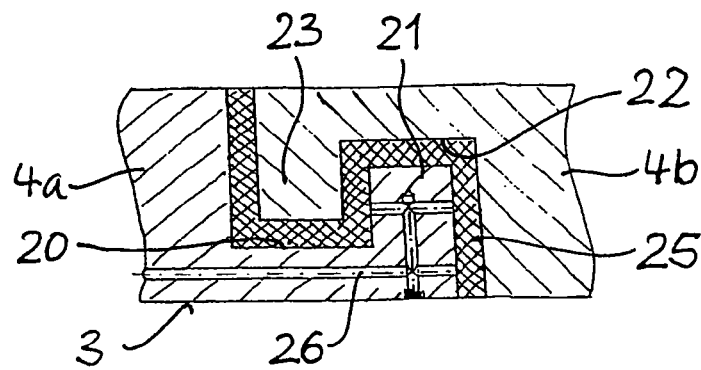
FIG. 4 is a cross-sectional view through a junction between two segments of a filling bell according to the invention.

As can be seen in particular from FIG. 4, the segments 4 are connected together at their adjacent edges in a positive and longitudinally displaceable manner. FIG. 4 shows a cross section through a junction between the right-hand edge of a first segment 4a and the left-hand edge of a second segment 4b. The right-hand edge of segment 4a has on the upper side remote from the sealing face 3 a longitudinal groove 20 and a rib 21 which delimits the longitudinal groove 20 on the outside. Longitudinal groove 20 and rib 21 are rectangular in cross section, and the width of the longitudinal groove 20 is approximately double the width of the rib 21. The height of the rib 21 is approximately two thirds the thickness of segment 4a. The left-hand edge of segment 4b is configured mirror-inversely to the right-hand edge of segment 4a and accordingly has on the side of the sealing face 3 a longitudinal groove 22 and a rib 23. Both segments are arranged with respect to one another such that their ribs 21, 23 engage in each case in the longitudinal grooves 20 and 22, respectively. There remains between the periphery of the ribs 21, 23 and the periphery of the longitudinal grooves 20, 22 an S-shaped gap of an approximately constant width which is filled with a sealing element 25 in the form of a profiled strip. The sealing element 25 seals the junction both in the longitudinal direction of the grooves and ribs and in the transverse direction. The sealing element 25 is secured to segment 4b by, for example, adhesion. The sealing element 25 can slide on segment 4a. This allows a relative movement between the segments 4a, 4b in the direction of the longitudinal grooves 20, 22. To reduce the frictional resistance between the sealing element 25 and segment 4a, segment 4a has holes 26 for supplying a lubricant into the slide gap.

The described connection consisting of longitudinal grooves, ribs and sealing element is provided at all adjacent edges of the segments 4, so that all segments 4 are connected together to form an annular unit. Within this unit, the individual segments 4 can only change their position together, in the same direction and by the same amount. Thus, the diameter of the annular flange 2 formed by the segments 4 can be changed by moving the segments 4, the annular flange 2 still retaining its closed annular shape and only the contour of the inner or outer edge changing. Furthermore, the mounting of the annular flange 2 in the radial slots 14 in the carrier plate 12 by means of the journals 15 arranged on the segments 4 ensures that the annular flange 2 retains its concentric position with respect to the bell ring 10 in all size positions.

Figure 5:
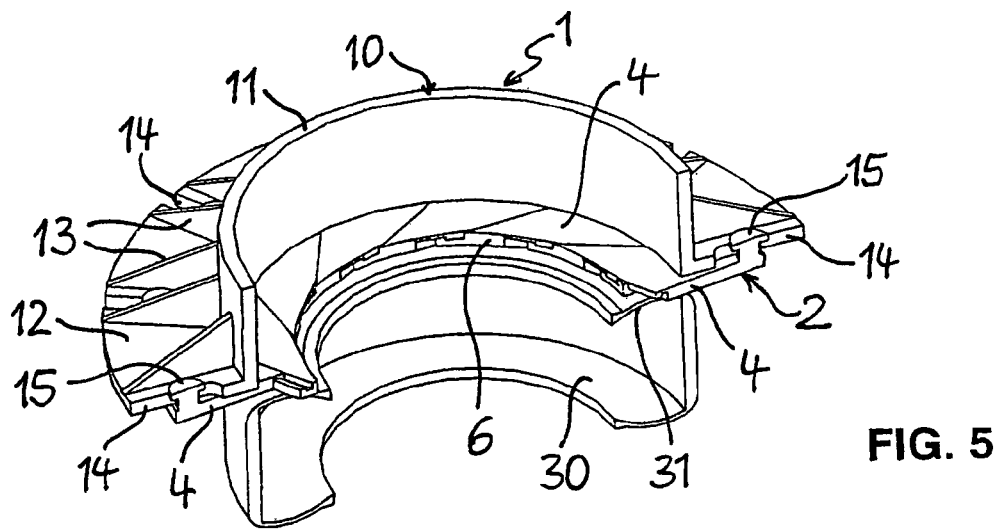
FIG. 5 is a partial view of the filling bell according to FIG. 3 resting against a tire and adjusted to a smaller diameter.

FIG. 5 shows an adjustment in which the opening 6 in the annular flange 2 is significantly smaller than the internal diameter of the bell ring 10. This adjustment is intended for filling a relatively small tire 30 which is shown here without the associated wheel rim. In this case, the annular flange 2 rests with its sealing face 3 on the side wall 31 of the tire 30 and thereby outwardly seals the interior of the filling bell 1 on the tire 30. The compressive force which acts on the annular flange 2 during the filling procedure is directly transmitted onto the carrier plate 12 by the annular flange 2, tilting forces which arise on the segments 4 being absorbed by the journals 15.

Figure 6:
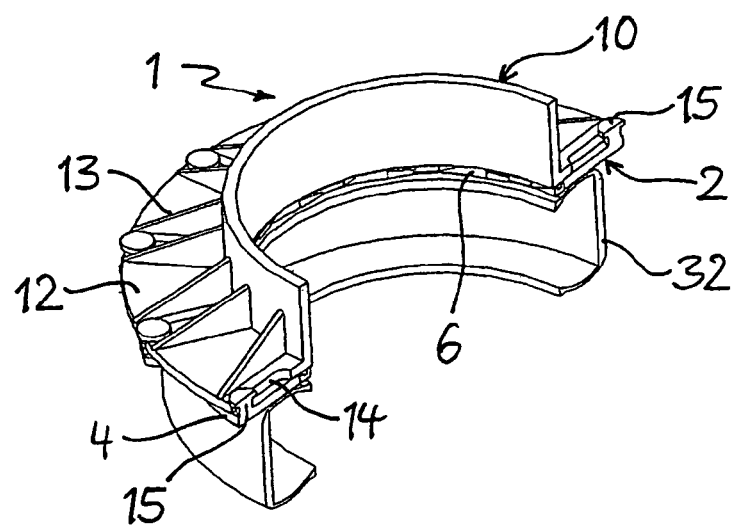
FIG. 6 is a partial view of the filling bell according to FIG. 3 resting against a tire and adjusted to the largest possible diameter.

FIG. 6 shows the use of the filling bell 1 on a tire 32 of a relatively large diameter. In this case, the annular flange 2 is adjusted such that its opening 6 has the greatest possible internal diameter which is approximately the same as the internal diameter of the bell ring 10. In this position, the segments 4 of the annular flange 2 rest with their rear side completely on the carrier plate 12, such that the compressive forces arising during the filling procedure can be supported in a trouble-free manner.

Figure 7:
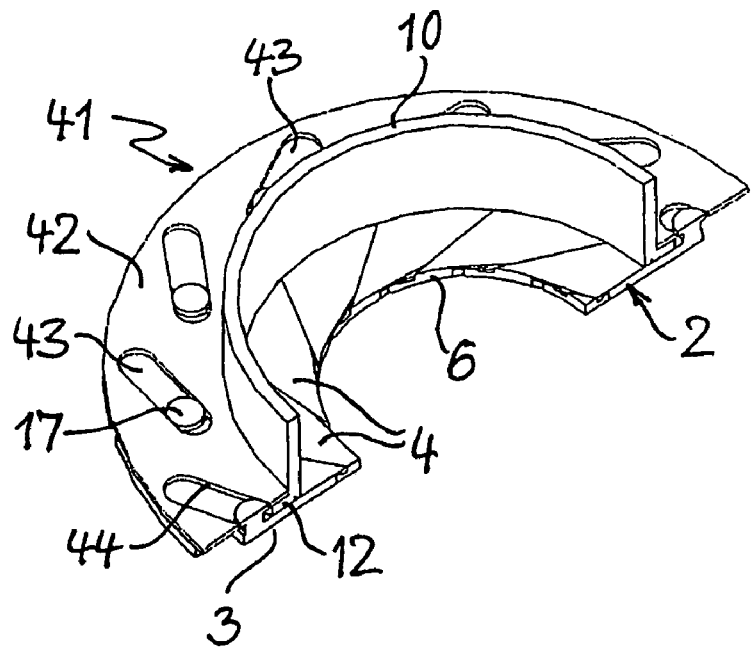
FIG. 7 is a partial view of another embodiment of a filling bell according to the invention.
Figure 8:
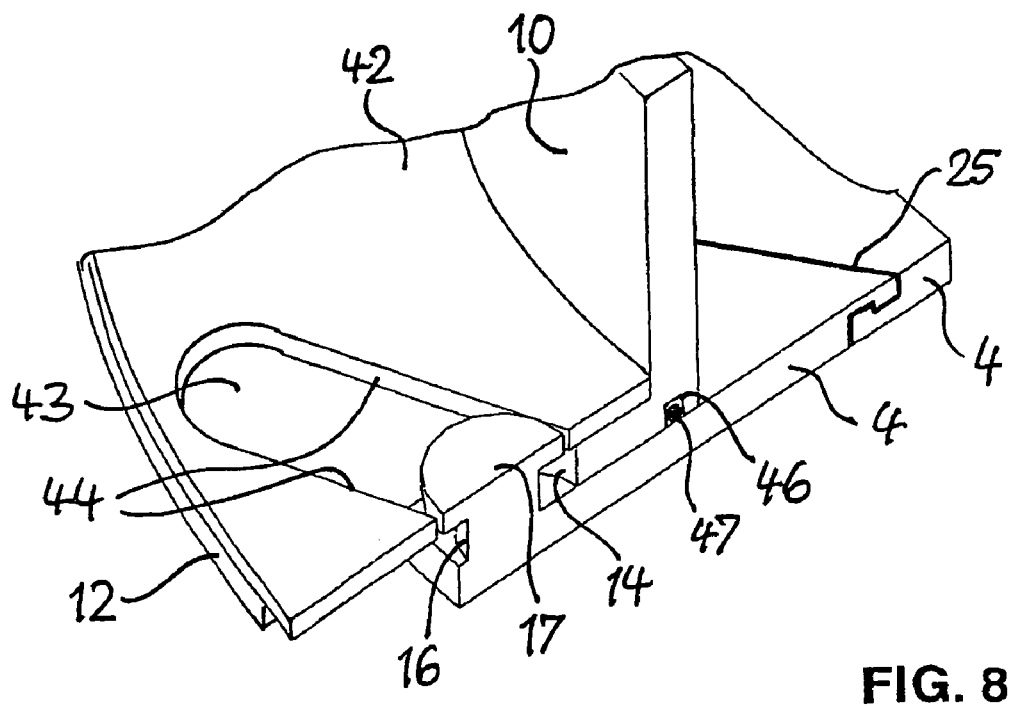
FIG. 8 shows an enlarged detail of the view according to FIG. 7.

FIGS. 7 and 8 show a further embodiment of a filling bell 41 which, unlike the filling bell 1, comprises a device for synchronously adjusting the annular flange 2 and the segments 4. For this purpose, the upper side of the carrier plate 12 is planar and is not interrupted by webs 13. Arranged on the carrier plate 12 is a disc cam 42 which has regularly-spaced openings 43 which are each in the shape of an elongated hole with parallel longitudinal sides and semi-circular end portions. The openings 43 are arranged in a rotationally symmetrical manner and obliquely such that their parallel side walls 44 form approximately at an angle of 45° to a radial line which crosses them. Engaging in each opening 43 is a head 17 of a journal 15 by which a segment 4 is held on the carrier plate 12. The width of the openings 43 is slightly greater than the diameter of the heads 17, such that the heads 17 can easily move in a longitudinal direction in the openings 43. The disc cam 42 surrounds the bell ring 10 and is mounted rotatably thereon.

In the position of the disc cam 42 shown in FIGS. 7 and 8, the segments 4 have moved radially inwards to a considerable extent such that they project inwards over the bell ring 10 and form an opening 6 which is considerably smaller than the internal diameter of the bell ring 10. To adjust the segments 4 in the sense of enlarging the opening 6, it suffices to rotate the disc cam 42 in the drawing in an anti-clockwise direction with respect to the carrier plate 12. Due to a rotation of this type, the heads 17 of the individual segments 4 are pressed radially outwards by the side walls 44 of the openings 43 and the segments 4 are moved accordingly, the segments 4 also sliding relative to one another on their positively connected edges and performing a slight rotation about their journal axis with respect to the carrier plate 12. Regardless of the various instantaneous movements, there results, however, an increase in the annular flange 2 and thus also in the opening 6, which does not change its concentric position with respect to the bell ring 10. The greatest possible diameter of the opening 6 is attained when the heads 17 of the journals 15 have entered the radially outer end position in the openings 43 in the disc cam 42.

The disc cam 42 can either be rotated manually using a suitable lever or in automatically operating installations by means of a suitable motor drive.

It can be seen from FIG. 8 how the segments 4 can be sealed with respect to the carrier plate 12. For this purpose, the carrier plate 12 has on its lower side an annular groove 46 in which is positioned a sealing ring 47, in particular an O ring which rests on the segments 4. This measure ensures that when tires are being filled, the compressed air or compressed gas cannot escape outwards between the carrier plate 12 and the segments 4.

Figure 9:
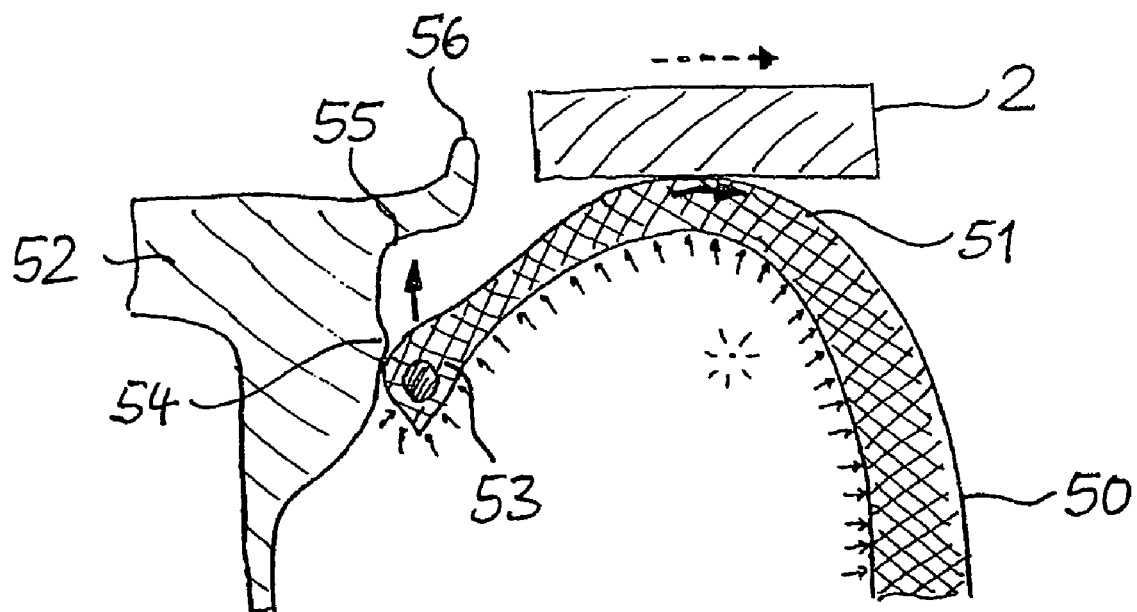
FIG. 9 is a schematic representation to illustrate the tire movement at the end of a tire inflation procedure.

In addition to the progressive adaptation of the diameter of the sealing face of the tire filling bell to tire or rim diameters which vary in size, the filling bell embodiment according to the invention also affords the possibility of promoting the movement of the tire at the end of the filling procedure such that the tire achieves the predetermined assembly end position on the rim with greater accuracy and reliability. FIG. 9 illustrates the situation towards the end of the tire filling procedure. The tire 50 has been filled with compressed air and is pressed with its upper side wall 51 against the annular flange 2, formed from segments 4, of the filling bell 1. In the opposite direction, the lower side wall of the tire 50 and the rim 52 rest on a supporting plate (not shown). In order for the tire 50 to be able to spring with its bead 53 over the hump 54 into its seat 55 on the rim flange 56 under the effect of the filling pressure, the side wall 51 must be able to move radially outwards. In the filling stations and filling bells known hitherto, the tire must overcome the frictional forces on the edge of the filling bell and the supporting plate. If the friction is too great, this can mean that the tire bead 53 does not spring over the hump and does not fit snugly against the rim flange 56 in the concave surface of the seat 55. If this is the case, the wheel will exhibit a high degree of non-uniformity when it rolls.

Assembly faults of this type can be effectively avoided by the filling bell according to the invention. Thus, it can be possible during the critical moment of the filling procedure to actuate the annular flange 2, for example using the disc cam 42, such that it increases its diameter. Such a radial increase in the annular flange 2 promotes the radial movement of the side wall of the tire and makes it easier to spring over the hump. Furthermore, an alternative could be to switch the drive for radially adjusting the annular flange 2 to be moment-free and consequently to allow the tire 50 to automatically expand the annular flange 2. However, since the segments of the annular flange 2 not only move radially but at the same time require a tangential displacement, it might be expedient in this case to additionally mount the filling bell such that it is freely rotatable to facilitate the movement of the segments.

Since comparable problems also occur in the case of the lower side wall of the tire, it can be advantageous when a radially adjustable annular flange consisting of wedge-shaped segments is also positioned in the region of the supporting plate, which annular flange can follow the deformation of the side wall of the tire by means of a drive or automatically.

What is claimed is:

1. A filling bell for filling a tubeless tire arranged on a wheel rim with a pressurized gas, comprising an annular sealing face which can be pressed onto a side wall of the tire and a central opening, into which the wheel rim can penetrate, wherein the sealing face is formed by an annular flange which surrounds the opening and comprises a plurality of wedge-shaped segments having divergent edges, the width of said segments increasing away from the central opening, and said segments being displaceable relative to one another and substantially radially relative to the opening.

2. The filling bell according to claim 1, wherein the segments are positively and longitudinally displaceably connected to one another at their divergent edges.

3. The filling bell according to claim 1, wherein a sealing element is arranged between each of the divergent edges of adjacent segments.

4. The filling bell according to claim 3, wherein the sealing element is a profiled strip made of a plastics material which fills the space between the segments and forms a sliding guide for moving the segments.

5. The filling bell according to claim 1, wherein the segments comprise holes for supplying a lubricant.

6. The filling bell according to claim 1, wherein on their side remote from the sealing face the segments have a journal, by which means they are radially displaceably and rotatably guided and held on a carrier plate.

7. The filling bell according to claim 1 wherein the segments are collectively displaceable by an actuation element.

8. The filling bell according to claim 7, wherein on their side remote from the sealing face the segments have a journal, by which means they are radially displaceably and rotatably guided and held on a carrier plate, and wherein the actuation element is a disc cam which is rotatably mounted on the filling bell and has effective surfaces which act on the journal and extend radially and in the circumferential direction.

9. The filling bell according to claim 7, wherein on their side remote from the sealing face the segments have a journal, by which means they are radially displaceably and rotatably guided and held on a carrier plate, and wherein the journal has a cylindrical shaft and at its free end a cylindrical head with a larger diameter, and wherein the shaft of the journal penetrates through a radial slot in the carrier plate and the head lies on the rear side of the carrier plate remote from the segment and engages in a driving recess of the actuation element.

* * * * *